United States Patent [19]

Yonekawa et al.

[11] Patent Number: 4,922,273

[45] Date of Patent: May 1, 1990

[54] COMPRESSION METHOD OF HALFTONE IMAGE DATA

[75] Inventors: Hisashi Yonekawa; Hiroshi Takeuchi, both of Hachioji, Japan

[73] Assignee: Konica Corporation, Tokyo, Japan

[21] Appl. No.: 176,769

[22] Filed: Apr. 1, 1988

[30] Foreign Application Priority Data

Apr. 2, 1987 [JP] Japan ................................. 62-79774
Apr. 2, 1987 [JP] Japan ................................. 62-79775

[51] Int. Cl.$^5$ ............................................. H04N 1/40
[52] U.S. Cl. ...................................... 358/429; 382/56
[58] Field of Search ................. 358/260, 261.1, 261.2, 358/261.3, 261.4, 262.1, 133, 135, 426, 427, 429; 364/725; 341/157, 166; 382/77, 50

[56] References Cited

U.S. PATENT DOCUMENTS

| 4,394,774 | 7/1983 | Widergren | 358/136 |
| 4,698,689 | 10/1987 | Tzou | 358/133 |
| 4,734,767 | 3/1988 | Kaneko | 358/133 |
| 4,748,511 | 5/1988 | Nichols | 358/260 |
| 4,797,653 | 1/1989 | Takayama | 341/67 |
| 4,797,945 | 1/1989 | Suzuki | 358/280 |

Primary Examiner—Edward L. Coles, Sr.
Assistant Examiner—Jerome Grant, II
Attorney, Agent, or Firm—Finnegan, Henderson, Farabow, Garrett and Dunner

[57] ABSTRACT

A halftone image data compression method includes steps wherein digital halftone image data is divided into a plurality of blocks, orthogonal transformation is performed in units of blocks to obtain transformed coefficients, and the transform coefficients are quantized and coded. A final quantization interval is determined in units of blocks using a frequency of generation of the AC components of the transform coefficients of each block quantized to zero as a parameter.

16 Claims, 19 Drawing Sheets

| k | i | $C_i$ | | | | | | | |
|---|---|---|---|---|---|---|---|---|---|
|   |   | $b_7$ | $b_6$ | $b_5$ | $b_4$ | $b_3$ | $b_2$ | $b_1$ | $b_0$ |
| 0 | 0 | 1 | 1 | 1 | 1 | 1 | 1 | 1 | 1 |
| 1 | 0 | 1 | 1 | 1 | 1 | 1 | 1 | 1 | 1 |
| 2 | 0 | 1 | 1 | 1 | 1 | 1 | 1 | 1 | 1 |
| 3 | 1 | 1 | 1 | 1 | 1 | 1 | 1 | 1 | 0 |
| 4 | 2 | 1 | 1 | 1 | 1 | 1 | 1 | 0 | 0 |
| 5 | 3 | 1 | 1 | 1 | 1 | 1 | 0 | 0 | 0 |
| 6 | 4 | 1 | 1 | 1 | 1 | 0 | 0 | 0 | 0 |
| 7 | 5 | 1 | 1 | 1 | 0 | 0 | 0 | 0 | 0 |
| 8 | 6 | 1 | 1 | 0 | 0 | 0 | 0 | 0 | 0 |
| 9 OR MORE | 7 | 1 | 0 | 0 | 0 | 0 | 0 | 0 | 0 |

| L | j | hLj |
|---|---|-----|
| 1 | 0 | $\bar{C}$ 1 |
|   | 1 | $\bar{C}$ 0 0 |
| 2 | 0 | $\bar{C}$ 0 1 0 0 |
|   | 1 | $\bar{C}$ 0 1 1 0 |
| 3 | 0 | $\bar{C}$ 0 1 0 0 0 0 |
|   | 1 | $\bar{C}$ 0 1 0 0 0 1 |
| 4 | 0 | $\bar{C}$ 0 1 1 1 0 1 |
|   | 1 | $\bar{C}$ 0 1 1 1 1 1 |
| 5 | 0 | $\bar{C}$ 0 1 1 1 0 0 1 |
|   | 1 | $\bar{C}$ 0 1 1 1 0 1 0 |
| 6 | 0 | $\bar{C}$ 0 1 0 0 1 0 1 0 |
|   | 1 | $\bar{C}$ 0 1 0 0 1 0 1 1 |
| 7 | 0 | $\bar{C}$ 0 1 1 1 0 0 0 0 |
|   | 1 | $\bar{C}$ 0 1 1 1 0 0 0 1 |
| 8 | 0 | $\bar{C}$ 0 1 0 0 1 0 0 1 0 |
| . |   |   |

FIG. 12A

| Z | rz |
|---|----|
| 1 | C 0 |
| 2 | C 1 |
| 3 | C 0 C 0 |
| 4 | C 0 C 1 |
| 5 | C 1 C 0 |
| 6 | C 1 C 1 |
| 7 | C 0 C 0 C 1 |
| 8 | C 0 C 1 C 0 |
| 9 | C 0 C 1 C 1 |
| 10 | C 1 C 0 C 0 |
| 11 | C 1 C 0 C 1 |
| 12 | C 1 C 1 C 0 |
| 13 | C 1 C 1 C 1 |
| 14 | C 0 C 0 C 0 C 0 |
| 15 | C 0 C 0 C 0 C 1 |
| . |  |

FIG. 12B

COMPRESSION METHOD OF HALFTONE IMAGE DATA

BACKGROUND OF THE INVENTION

1. Field of the Invention

The present invention relates to a compression method of halftone image data, for compressing data of halftone images including medical images such as an X-ray image, CT image, and the like.

2. Description of the Prior Art

Along with the development of digital techniques, halftone images are converted to digital data, and the digital halftone image data are stored, transferred, and subjected to a variety of digital image processing. However, a halftone image has a larger data volume than that of a binary image. Therefore, a large data volume when the halftone image is converted to digital data poses a problem. In particular, in medical images, e.g., an X-ray photograph of the thorex of a patient, the number of pixels upon digitization and the number of bits necessary for each pixel are respectively very large, i.e., four million pixels and 8 to 10 bits, resulting in poor efficiency of data storage and transfer.

A data compression technique for compressing a very large volume of data of a halftone image including a medical image has received a lot of attention.

The data compression technique can be roughly classified into reversible compression and irreversible compression. Since a low compression ratio of about ½ to ⅓ can only be expected in the reversible compression method, an irreversible compression method capable of obtaining a high compression ratio of 1/5 or higher, in particular, a transform coding method is receiving a great deal of attention.

The transform coding method is one of irreversible compression methods, and is most suitable for compressing a halftone image. In this method, the entire image is divided into small blocks, and orthogonal transformation is performed in units of blocks to obtain transform coefficients. The transform coefficients are quantized to code the original image.

In the transform coding method, it is known that a distribution of AC components of the transform coefficients can be approximated to a Gaussian distribution having a peak at zero. It is reported that when quantization of the transform coefficients having such a distribution is classified into Mid-riser quantization including "zero" in quantization levels, and Mid-trace quantization including "zero" in quantization output levels, the Mid-trace quantization is preferable since random noise components generated upon image reconstruction are small. However, when a Mid-trace type quantizer is used, if a compression ratio is increased, a pattern image inherent to components undesirably appears. Thus, if image processing such as enlargement, gray scale modification, frequency domain processing, or the like is performed, an unnatural image appears, and reproducibility of an original image is impaired.

When Mid-trace quantization is performed, image quality of a reconstructed image strongly depends on the number of AC components quantized to zero in a quantization process upon compression. More specifically, images in blocks of a reconstructed image are converted to a weighted sum of patterns inherent to AC components which are quantized to levels other than zero. Therefore, if the number of AC components quantized to levels other than zero is small, a pattern image inherent to components appears in the reconstructed image. In order to suppress appearance of the pattern image inherent to components, a quantization interval of a quantization level causing quantization output level to be zero is narrowed to decrease the number of AC components quantized to zero. However, in this case, an average code length upon coding is increased, thus decreasing a compression ratio.

Thus, it was found that if the frequency of generation of AC components quantized to zero is checked in units of blocks to detect a block in which a pattern image inherent to components tends to appear, and if a quantization interval of the detected block is narrowed, a reconstructed image in which appearance of a pattern image is suppressed can be obtained.

In the conventional technique, as parameters for determining a quantization interval, a square sum, a variance, an absolute value sum, and a standard deviation of AC components are used. In these parameters, however, round-off of data by quantization, in particular, round-off when components are quantized to zero, is not taken into consideration upon determination of the quantization interval. In addition, the quantization interval tends to be largely influenced by values of components having large absolute values.

In accordance with a principle of this invention, when the quantization interval is determined, round-off of components quantized to zero must be considered, and the quantization interval should not be largely influenced by the values of components having large absolute values. This principle is very important when Mid-trace quantization is performed as described above.

As a means for realizing a quantization interval determination method, the present invention proposes the following three methods.

(1) First Quantization Interval Determination Method

A plurality of different quantization intervals are prepared in advance, and the number of AC components quantized to zero in each block when AC components in each block are quantized using the respective quantization intervals are calculated in units of quantization intervals. A quantization interval with which the maximum calculated number below a predetermined threshold level is obtained is detected, and the AC components of the corresponding block are quantized using the detected quantization interval or an approximated value of the detected quantization interval.

(2) Second Quantization Interval Determination Method

AC components are reordered from ones having smaller absolute values, and a component whose component number counted from the component having the smallest absolute value is equal to a predetermined threshold level is detected. Then, the absolute value of the component or an approximated value of the absolute value is determined to be a quantization interval of the corresponding block.

(3) Third Quantization Interval Determination Method

The number of AC components quantized to zero in each block upon quantization of AC components is calculated using a predetermined quantization interval. A small quantization interval is assigned to a block having a large calculated number, and a quantization interval to be assigned is gradually increased as the calculated number is decreased.

As a technique for obtaining a high compression ratio in the transform coding, a method of increasing a quantization interval and a method of cutting high-sequency components are known. For the aforementioned reasons, it is not preferable that a quantization interval is increased too large. It is preferable that a quantization interval which does not cause image degradation is calculated in units of blocks, and the image is quantized using a quantization interval smaller than the calculated quantization interval.

In each quantization interval calculated by the above-mentioned method, the relationship between a degree of cutting high-sequency components and image degradation was examined. It was concluded that the degree of cutting high-sequency component is preferably defined as a function of a quantization interval.

When high-sequency components are cut, a reconstructed image tends to be blurred. However, for a block having a small quantization interval, the degree of cutting high-sequency components is increased, and as the quantization interval is increased, the degree of cutting high-sequency components is decreased. In this case, even when a compression ratio is increased, a good reconstruction image in which image blurring is not conspicuous can be obtained.

As a means for realizing a determination method of the degree of cutting high-sequency components, the present invention proposes the following three methods.

(1) First High-sequency Cutting-off Method

The number of components to be coded is defined in advance as a function of a quantization interval. This function is preferably determined such that the number of components to be coded is decreased as the quantization interval is decreased.

(2) Second High-sequency Cutting-off Method

The number of components to be coded (those which are quantized to levels other than zero) is defined in advance as a function of a quantization interval. This function is preferably determined such that the number of components to be coded (those which are quantized to levels other than zero) is decreased as the quantization interval is decreased.

(3) Third High-sequency Cutting-off Method

A ratio of the number of components to be coded of those quantized to levels other than zero to the total number of components quantized to levels other than zero upon quantization is defined in advance as a function of a quantization interval. This function is preferably determined such that the number of components to be coded (those which are quantized to levels other than zero) is decreased as the quantization interval is decreased.

The above-mentioned functions are set for every compression ratio, and the function is selected in accordance with a compression ratio selected by a user, thereby easily changing the compression ratio of image data.

SUMMARY OF THE INVENTION

It is an object of the present invention to obtain a good reconstructed image which is free from generation of a pattern image inherent to components, and in which image quality degradation is not conspicuous when data of a halftone image including a medical image is compressed at various compression ratios using a transform coding technique.

In order to achieve the above object, when Mid-trace quantization is performed, a quantization interval suitable for each block is calculated while the frequency of generation of AC components of transform coefficients quantized to zero in each block is used as a parameter, and the quantization is performed using the calculated quantization interval or an approximated value thereof. In addition the degree of cutting high-sequency components of each block is determined on the basis of the quantization interval and the compression ratio.

BRIEF DESCRIPTION OF THE DRAWINGS

FIG. 12A is a table showing a Huffman coding LUT;

FIG. 12B is a table showing a run length coding LUT;

DETAILED DESCRIPTION OF THE PREFERRED EMBODIMENTS

The present invention will be described hereinafter with reference to the accompanying drawings.

Figure 1:
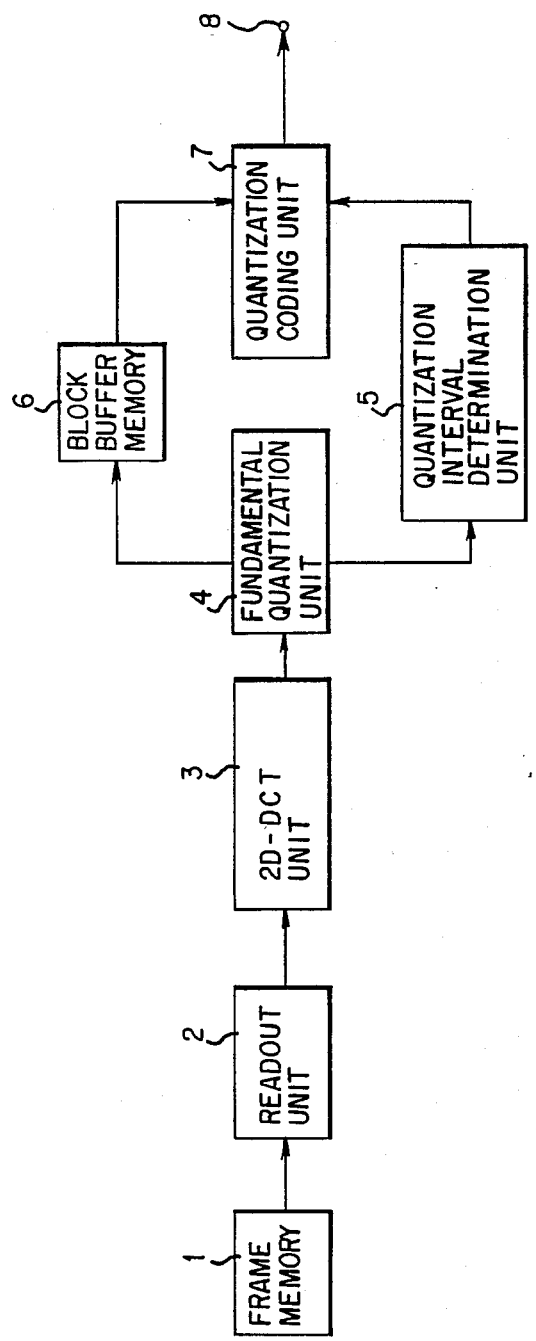
FIG. 1 is a block diagram showing an embodiment of a halftone image data compression method according to the present invention.

FIG. 1 is a block diagram showing an embodiment of a halftone image data compression method according to the present invention.

Referring to FIG. 1, a frame memory 1 stores halftone image data (in this embodiment, the number of bits per pixel is 8 bits) to be compressed. A readout unit 2 reads out image data from the frame memory 1 in units of blocks (in this embodiment, a block size corresponds to 16×16 (pixels) in both line and column directions). The readout block data is subjected to cosine transformation by a two-dimensional discrete cosine transformation (2D-DCT) unit 3, thus obtaining 256 transform coefficients per block.

Of the 256 transform coefficients thus obtained, 255 AC components excluding one DC component are uniformly quantized by a fundamental quantization unit 4 using a fundamental quantization interval $W_0$, thereby obtaining a pair of a coefficient number as a fixed length code and a polarity number for each component. The pairs of coefficient numbers and polarity numbers are temporarily stored in a block buffer memory 6, and the coefficient numbers are sent to a quantization interval determination unit 5.

In the quantization interval determination unit 5, a quantization interval for each block is determined in accordance with the coefficient numbers of one block sent from the fundamental quantization unit 4, and is output to a quantization coding unit 7. When the quantization coding unit 7 fetches the quantization interval sent from the quantization interval determination unit 5, it reads out the pairs of coefficient numbers and polarity numbers for one block from the block buffer memory 6, and converts the fixed length codes (numbers) into variable length codes. Then, the unit 7 outputs the converted codes to a terminal 8. The code data are transmitted from the terminal 8 or are stored in a memory.

Figure 2A:
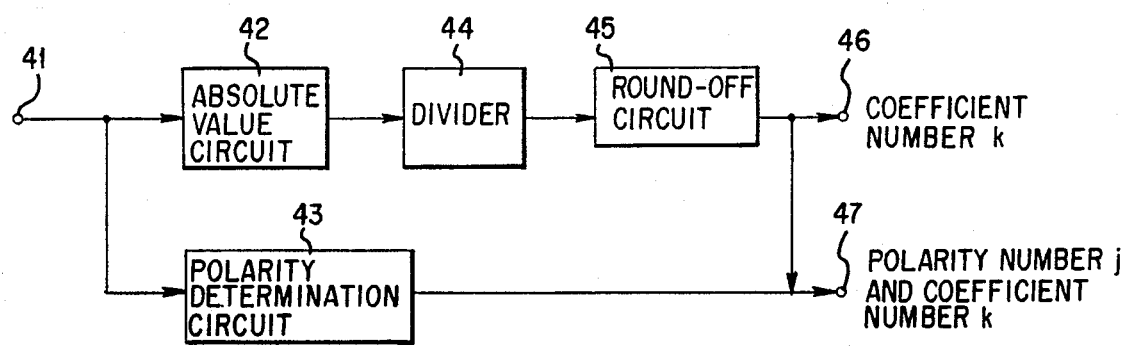
FIG. 2A is a diagram showing a basic arrangement of a fundamental quantization unit shown in FIG. 1.

FIG. 2A shows an embodiment of the fundamental quantization unit 4.

255 AC components of the transform coefficients for one block excluding one DC component are input from a terminal 41. The absolute values of the 255 AC components are calculated by an absolute value circuit 42. At the same time, the AC components are subjected to polarity detection of the transform coefficients in a polarity detection circuit 43. The polarity detection circuit 43 outputs the detection result to a terminal 47 as a polarity number. In this case, a polarity number is represented by a 1-bit code j, and when the transform coefficient is negative, the code is set to be "1"; otherwise, "0".

The absolute values of the transform coefficients output from the absolute value circuit 42 are divided by the fundamental quantization interval $W_0$ in a divider 44. The fractions below the decimal point of the quotients are rounded off by a round-off circuit 45 (the results will be referred to as coefficient numbers k (k=0, 1, 2, 3, ...), and the results are output to terminals 46 and 47. The terminal 46 is connected to the quantization interval determination unit 5, and the terminal 47 is connected to the block buffer memory 6. The polarity number j and the coefficient number k obtained for one transform coefficient input from the terminal 41 are paired, and the pair is temporarily stored in the block buffer memory 6 through the terminal 47.

The DC component of each block is uniformly quantized by a sufficiently small quantization interval $W_{dc}$ or is not subjected to quantization, and is allotted with a fixed length code and output from terminal 8.

Figure 3:
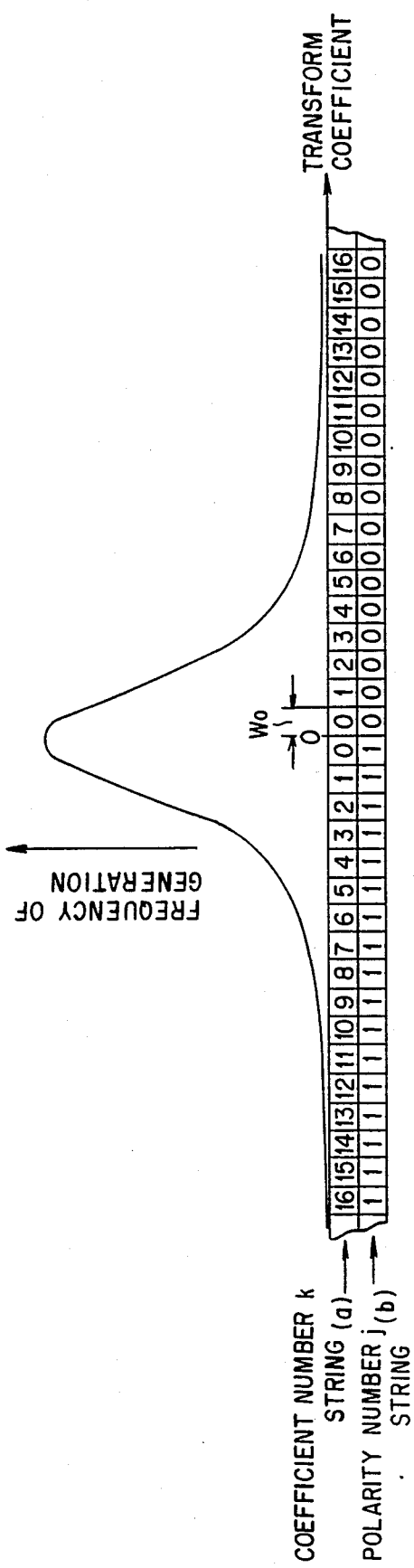
FIG. 3 is a chart showing a coefficient number and a polarity number obtained by quantizing AC components of transform coefficients as a function of the frequency of generation of transform coefficients.

FIG. 3 shows a state of fundamental quantization of AC components of transform coefficients.

Transform coefficient values are plotted along the abscissa, and the frequency of generation of transform coefficients is plotted along the ordinate. A number string shown in FIG. 3(a) is a string of coefficient numbers k output from the round-off circuit 45, and a number string shown in FIG. 3(b) is a string of polarity numbers j output from the polarity detection circuit 43.

Figure 4A:
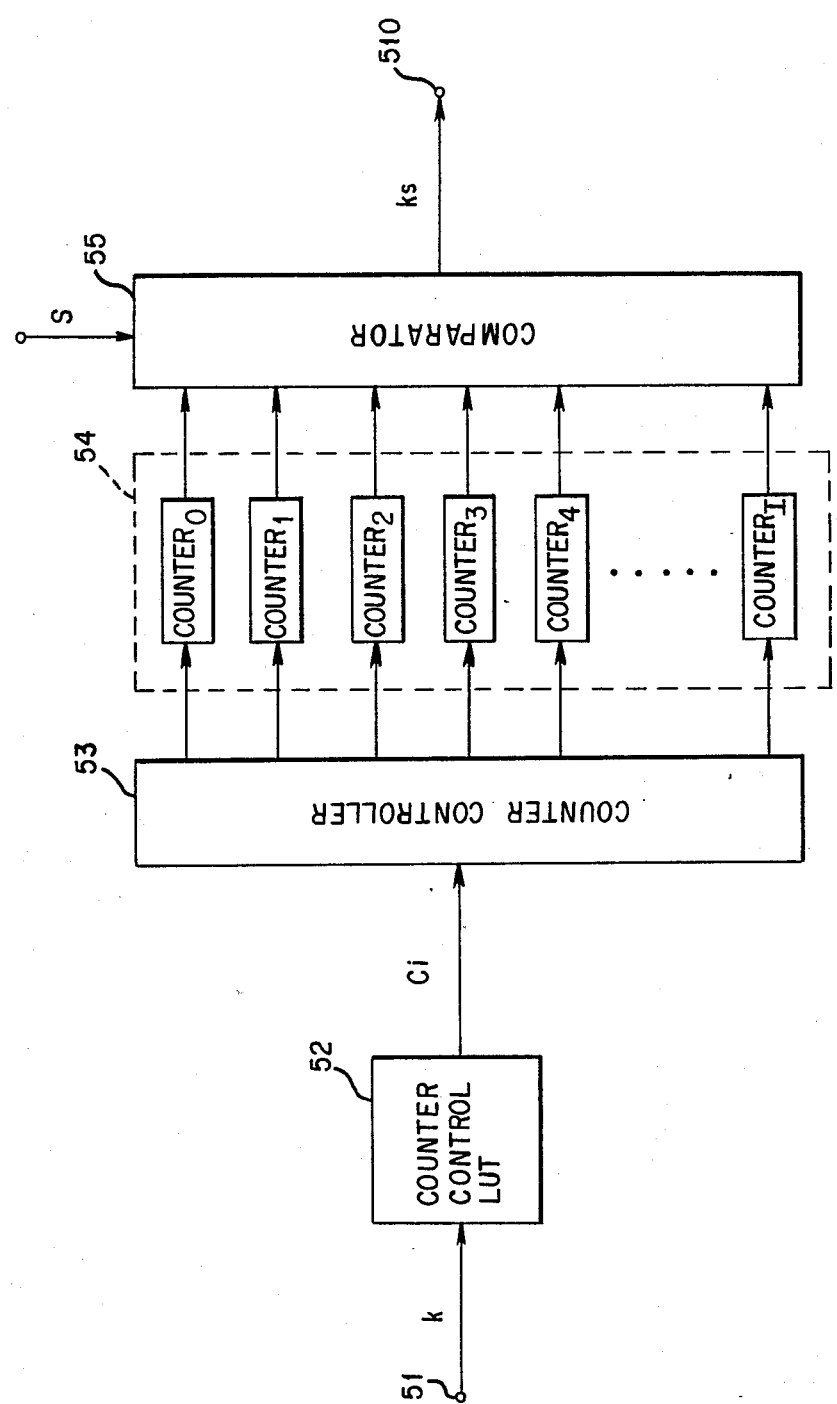
FIGS. 4A, 4B, and 4C are block diagrams showing different embodiments of a quantization interval determination unit shown in FIG. 1.
Figure 4B:
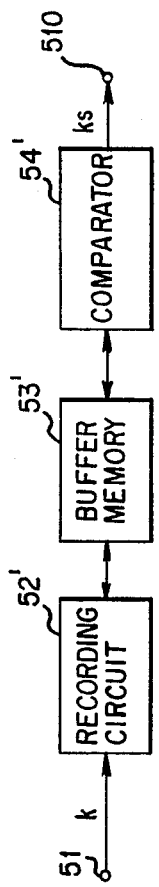
Figure 4C:
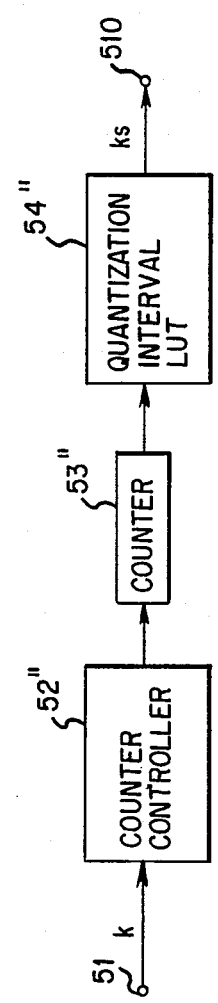

An embodiment of the quantization interval determination unit 5 will be described below FIGS. 4A, 4B, and 4C show quantization interval determination units 5 when the three types of quantization interval determination methods described above are used, respectively.

FIG. 4A shows the quantization interval determination unit 5 when the first quantization interval determination method is used, and the operation thereof will be described below.

A terminal 51 is connected to the terminal 46 shown in FIG. 2A. The coefficient numbers k (k=0, 1, 2, 3, ...) are input through the terminal 51, and are converted to counter control codes $C_i$ (i=0, 1, 2, ..., I) by a counter control LUT 52.

Figures 5A, 5B:
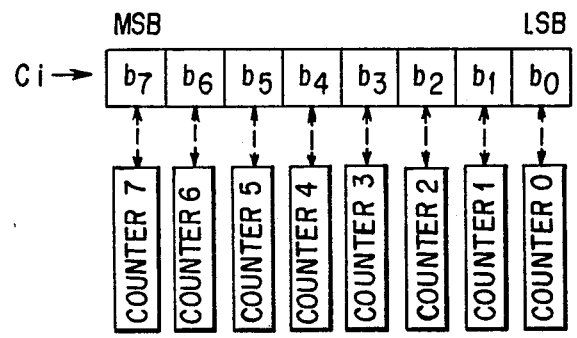
FIG. 5A is a table showing a counter control LUT.
FIG. 5B is a chart showing the relationship between a counter control code and counters.

FIG. 5A shows the counter control LUT 52 when I=7. A counter controller 53 fetches the counter control codes $C_i$, and controls (I+1) counters (i.e., a counter 0 to a counter I) in a counter circuit 54 in accordance with on/off states of the bits of the counter control codes $C_i$.

As shown in FIG. 5B, the bits of each counter control code $C_i$ are corresponded to counter 0, counter 1, counter 2, ..., counter I from the least significant bit (LSB). If a bit is ON (=1), the counter controller 53 counts up the corresponding counter by +1, and if a bit is OFF (=0), it does not count up the corresponding counter.

Figure 6A:
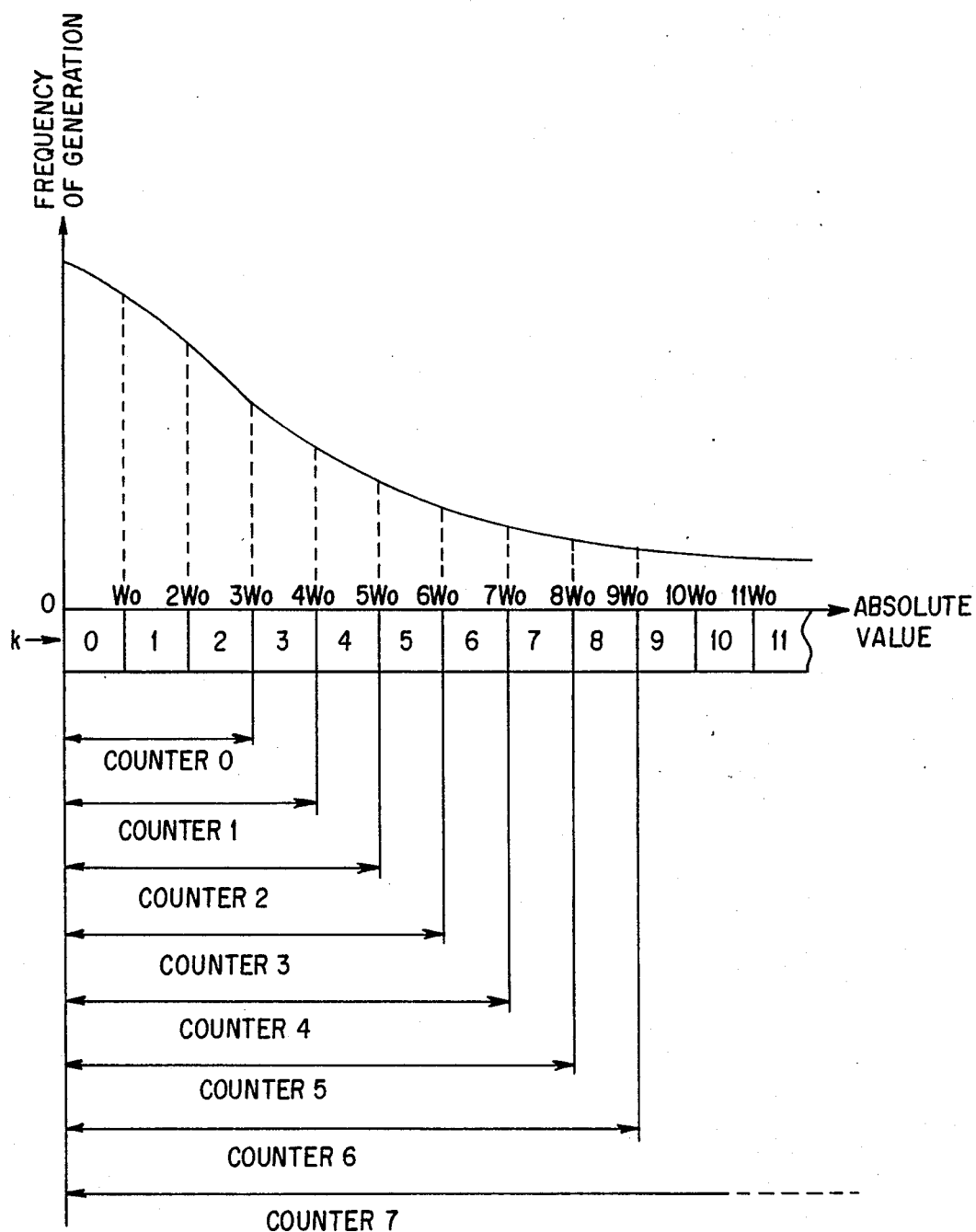
FIG. 6A is a graph showing operation ranges of counters in a counter circuit.

FIG. 6A is a chart showing operation ranges of the counters when I=7.

Each counter is operated within a range of the coefficient numbers k indicated by the corresponding arrow in FIG. 6A. However, the counter I (in this case, counter 7) is operated for all the coefficient numbers k, and serves to signal completion of a count operation for one block.

As will be described later, since the operation ranges of these counters are equal to a value ½ the quantization interval (to be referred to as a ½ quantization interval hereinafter), values of the lower limit (i.e., the operation range of the counter 0) and the upper limit (i.e., the operation range of the counter (I-1)) of the operation range of the counters are determined by the upper and lower limits of the quantization interval.

When the count operation for one block is completed, a comparator 55 of the quantization interval determination unit 5 shown in FIG. 4A compares the count values of the counters with a predetermined threshold level S, so that an operation range $k_s$ for the coefficient number k of the counter having the maximum count value below S is calculated as a ½ quantization interval, and the value of the ½ quantization interval $k_s$ is output from a terminal 510. When a quantization interval for the coefficient number k is represented by $e_k$, $e_k$ takes a value twice $k_s$ ($e_k = 2k_s$). Therefore, a quantization interval $e_W$ for a transform coefficient W prior to fundamental quantization with the fundamental quantization interval $W_0$, and a ½ quantization interval $W_s$ can be respectively calculated by:

$$W_s = k_s \cdot W_0$$

$$e_W = 2 \cdot W_s$$

Figure 6B:
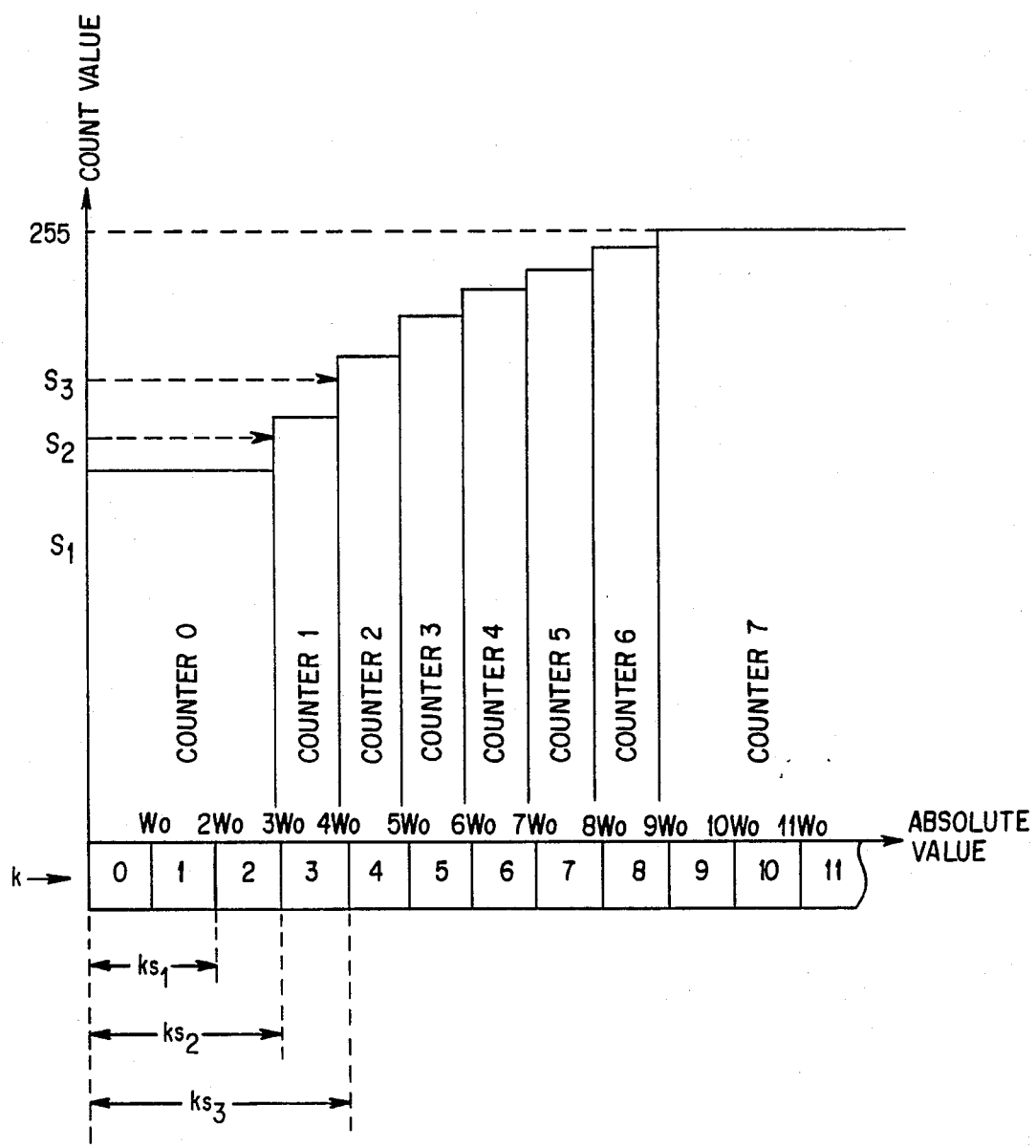
FIGS. 6B to 6D are graphs showing different methods of calculating a quantization interval.

FIG. 6B is a graph showing the relationship among the count values of the counters, coefficient numbers k, the threshold level S, and the ½ quantization intervals $k_s$.

The graphs of the count values respectively represent the accumulated frequency of the coefficient numbers k in one block. Assuming that the threshold level S takes three values, $S_1$, $S_2$, and $S_3$, if $S=S_3$, $k_s=k_{s3}$ (=4), and if $S=S_2$, $k_s=k_{s2}$ (=3).

However, if the count values of the counters are larger than the S value like in $S=S_1$, a predetermined value is assigned to $k_s$ in order to prevent that $k_s$ takes an unnecessarily small value. A too small quantization interval results in only an increase in coding amount, and is not effective for improving image quality of a reconstructed image. In this embodiment, when $S=S_1$, $k_s=k_{s1}$ (=2).

Figure 6C:
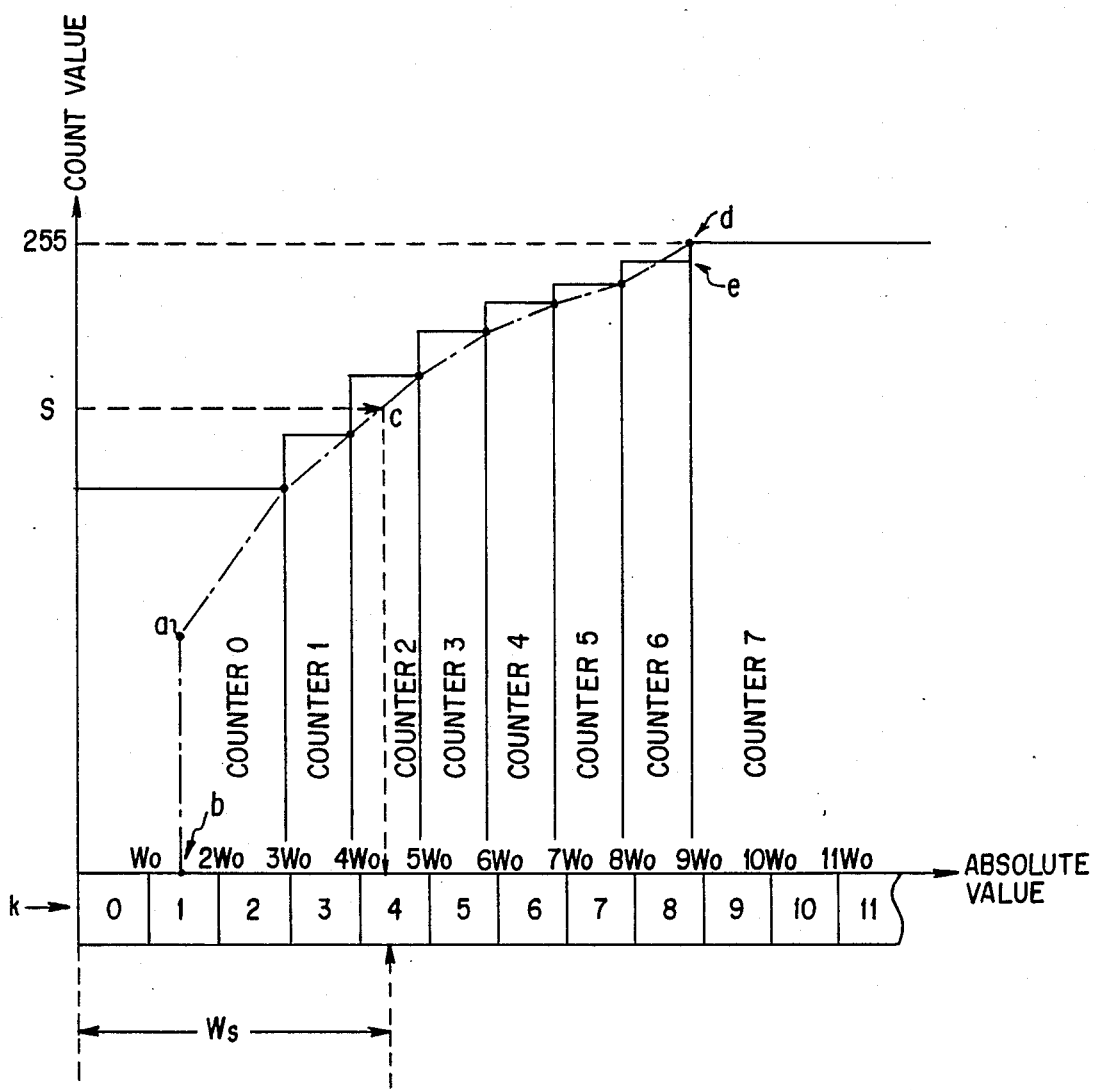

FIG. 6C is a graph showing a technique for calculating the ½ quantization interval $W_s$ at a resolution prior to fundamental quantization using the fundamental quantization interval $W_0$ when the counters are operated at a resolution (=$W_0$) of the coefficient number k.

As indicated by an alternate long and short dashed line in FIG. 6C, the count values of the counters are connected by an interpolation curve, and an absolute value coordinate position of an intersection c between the curve and the S value is determined as the ½ quantization interval $W_s$. When the interpolation curve is calculated, a start point (the side of a smaller absolute value) and an end point (the side of a larger absolute value) of the curve are preferably processed as follows. A straight line portion having a constant absolute value defined between points a and b in FIG. 6C is formed at the start point side to prevent unnecessarily small $W_s$. This means determination of the lower limit of the quantization interval $e_W$, thereby preventing an undesirable increase in coding amount by a too small quantization interval. At the end point side, the end point of the curve is determined not at point e but at point d, thereby preventing unnecessarily large $W_s$. This means determination of the upper limit of the quantization interval $e_W$, thereby preventing degradation of image quality due to too large quantization interval. If linear interpolation is used upon calculation of $W_s$, the amount of calculation necessary for calculating $W_s$ can be decreased.

Figure 6D:
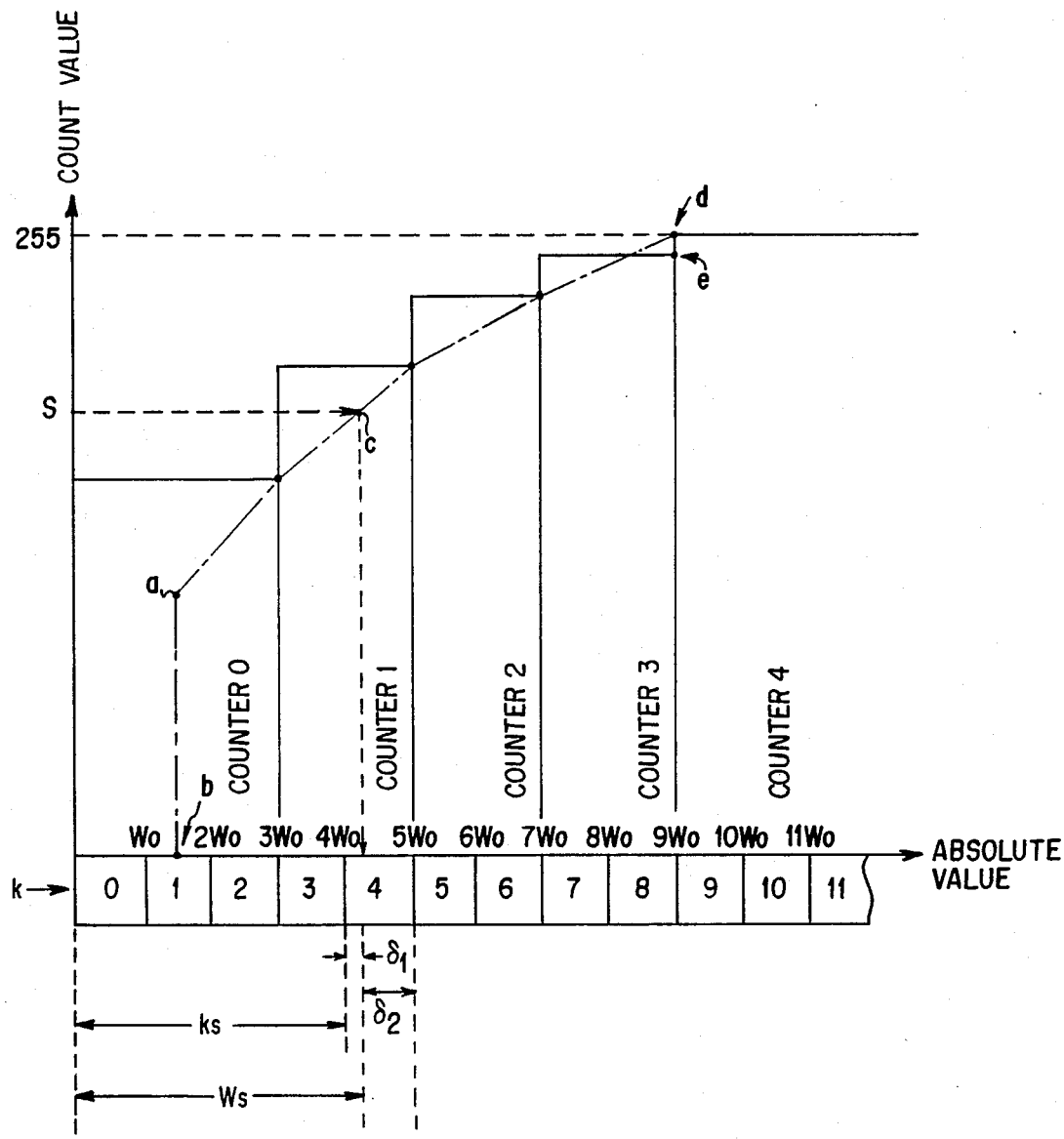

FIG. 6D is a graph showing a method of calculating the ½ quantization interval $k_s$ and $W_s$ when the count operation is performed by a smaller number I'+1 (in this embodiment, I'=3) of counters than the number I+1 of the counters to be prepared (in this embodiment, I=7) and at the same resolution as in the case wherein the number of counter is I+1.

The absolute value coordinate position of the point c is calculated by interpolation as in FIG. 6C, and can be determined as $W_s$. In order to calculate $k_s$ from $W_s$, of quantization points at both sides of $W_s$ in this embodiment, $4W_0$ and $5W_0$), a quantization point closest to $W_s$ (in this embodiment, $4W_0$) is calculated, and a value representing an interval from 0 to this quantization point by the coefficient numbers k is determined as $k_s$ (in this embodiment, $k_s=4$). Alternatively, a quantization point near zero and closest to $W_s$ (in this embodiment, $4W_0$) is calculated, and a value representing an interval from 0 to this quantization point by the coefficient numbers k is determined as $k_s$ (in this embodiment, $k_s=4$).

When the number of counters is decreased as in this embodiment, the size of the apparatus can be reduced.

FIG. 4B shows the quantization interval determination unit 5 when the second quantization interval determination method is used.

A terminal 51 is connected to the terminal 46 shown in FIG. 2A. When the coefficient numbers k output from the fundamental quantization unit 4 are input through the terminal 51, a reordering circuit 52' stores the coefficient numbers k in a buffer memory 53'. In this case, the reordering circuit 52' stores the coefficient numbers k in the buffer memory 53' so that the coefficient numbers k are ordered in the ascending order.

When the reordering of the coefficient numbers k for one block is completed, a comparator 54' checks a value $\bar{k}$ of an Sth coefficient number counted from the smallest one in the buffer memory 53', and sets the ½ quantization interval $k_s$ to be $k_s=\bar{k}$. Then, the set interval is output through a terminal 510. However if $\bar{k}=0$, a predetermined value (in this embodiment, $k_s=2$) is assigned to $k_s$.

In this method, the same processing as in FIG. 4A is realized by reordering instead of using the counters. Note that the reordering of this unit may be performed for absolute values of transform coefficients W prior to quantization using the fundamental quantization interval $W_0$, or the interpolation method as described with reference to FIG. 6C is used, thereby calculating the ½ quantization interval $W_s$ at a resolution prior to the fundamental quantization.

FIG. 4C shows the quantization interval determination unit 5 when the third quantization interval determination method is used.

A terminal 51 is connected to the terminal 46 shown in FIG. 2A. When the coefficient numbers k output from the fundamental quantization unit 4 are input through the terminal 51, the number of "k"s satisfying $0 \leq k \leq K$ (K is a predetermined constant) is counted by a counter 53".

When the count operation of the coefficient numbers k for one block is completed, a count value v of the counter 53" is transformed to the ½ quantization interval $k_s$ by a quantization interval LUT 54", and the interval is output from a terminal 510.

Figure 7A:
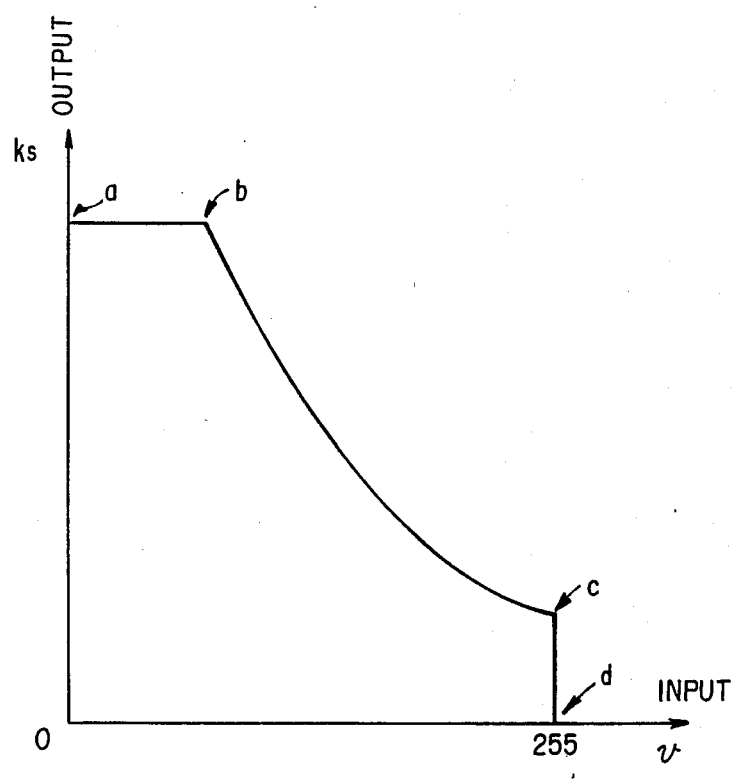
FIG. 7A is a graph showing an LUT used in a method of determining a quantization interval using one counter.

FIG. 7A shows the quantization interval LUT 54".

Straight lines ab and cd in FIG. 7A respectively define the upper and lower limits of the ½ quantization interval $k_s$.

In an apparatus in which a plurality of compression ratios are prepared and can be selectively used, an upper limit value of the ½ quantization interval $k_s$ is determined for each compression ratio. When the ½ quantization interval $k_s$ output from the terminal 510 shown in FIGS. 4A, 4B, or 4C exceeds the upper limit value, the value of $k_s$ is preferably replaced with the upper limit value. In particular, when a low compression ratio is selected, a small upper limit value is preferably set to improve reproducibility of a reconstructed image.

Figure 7B:
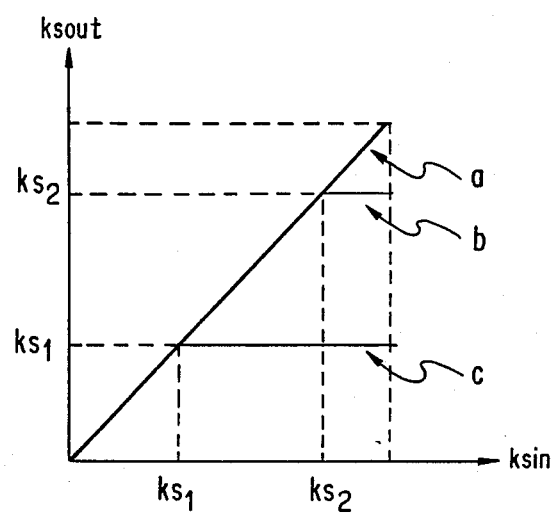
FIG. 7B is a graph showing an LUT for determining an upper limit of a quantization interval.

FIG. 7B shows an embodiment of an LUT when the above operation is performed using the LUT. For example, the ½ quantization interval is passed through the LUT having the characteristics as shown in FIG. 7B immediately before output of ½ quantization interval from terminal 510. In FIG. 7B, an input ½ quantization interval is represented by $k_{sin}$, and an output quantization interval is represented by $k_{sout}$. A line a represents an example of the LUT when a high compression ratio is selected, and $k_{sout}=k_{sin}$ for all "$k_{sin}$"s. A line b represents an example of the LUT when an intermediate compression ratio is selected. If $k_{sin} < k_{s2}$, $k_{sout} = k_{sin}$, and if $k_{sin} \geq k_{s2}$, $k_{sout} = k_{s2}$. A line c represents an example of the LUT when a low compression ratio is selected. If $k_{sin} < k_{s1}$, $k_{sout} = k_{sin}$, and if $k_{sin} \geq k_{s1}$, $k_{sout} = k_{s1}$.

An embodiment of the quantization coding unit 7 will be described hereinafter.

Figure 8A:
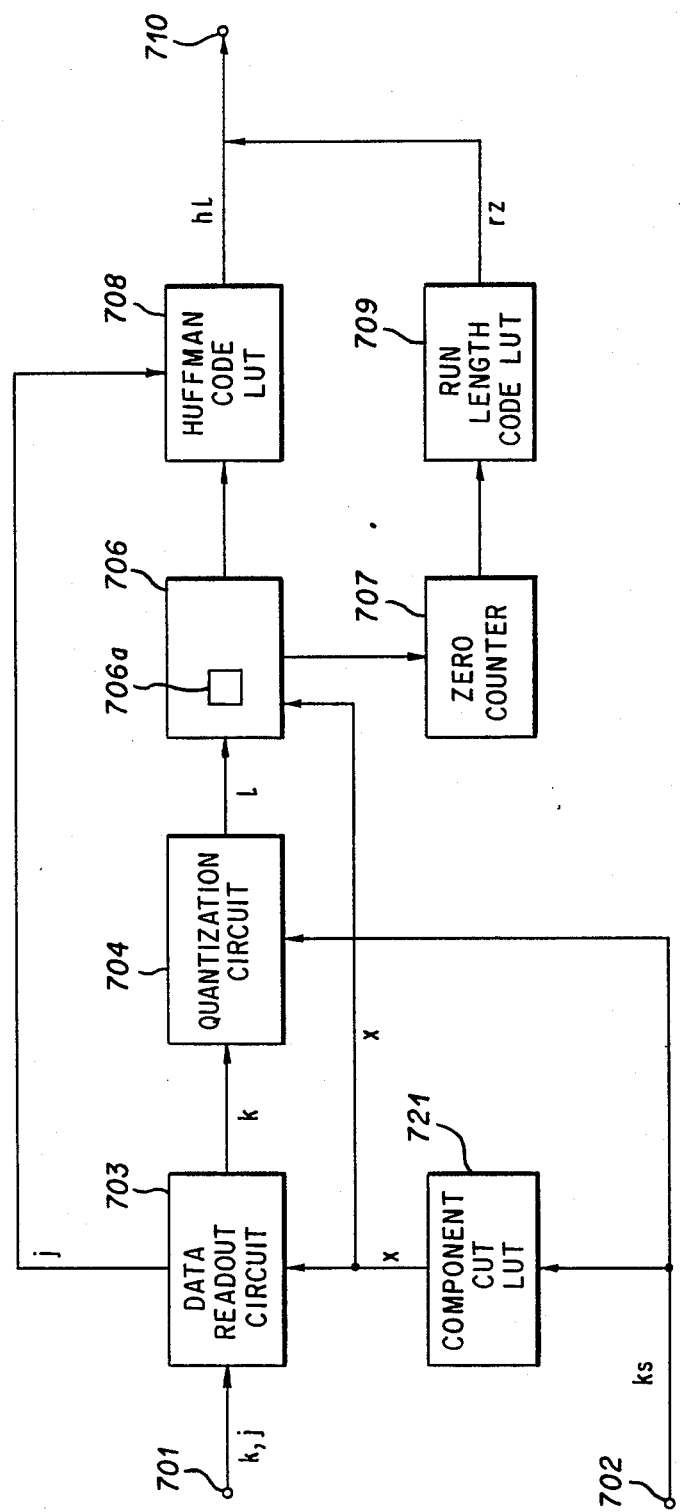
FIGS. 8A, 8B, and 8C are block diagrams showing other embodiments of the quantization unit shown in FIG. 1.
Figure 8B:
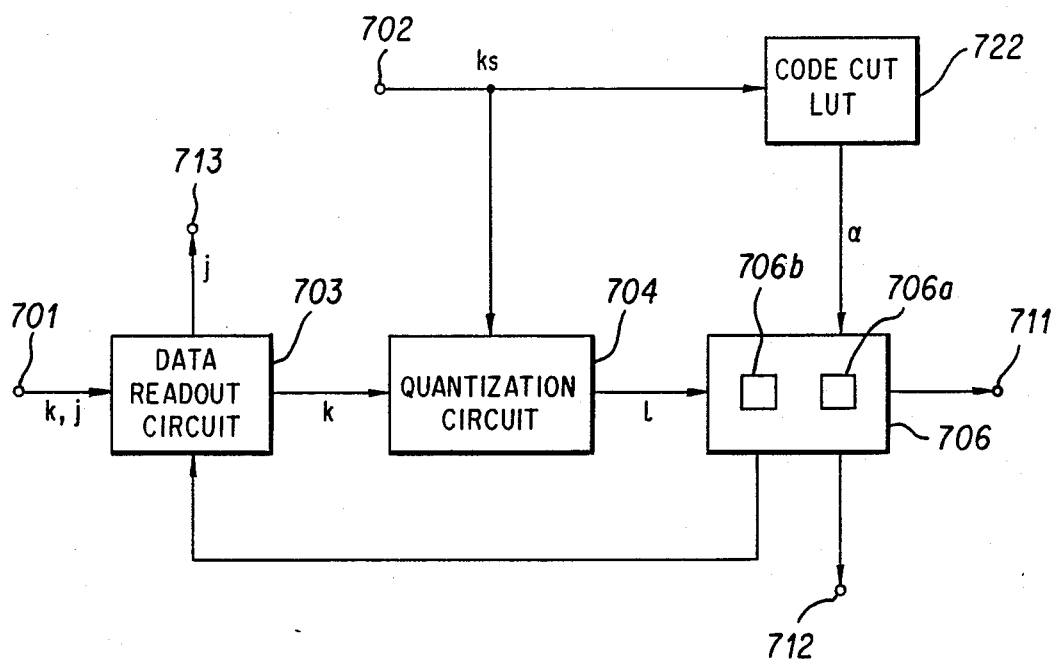
Figure 8C:
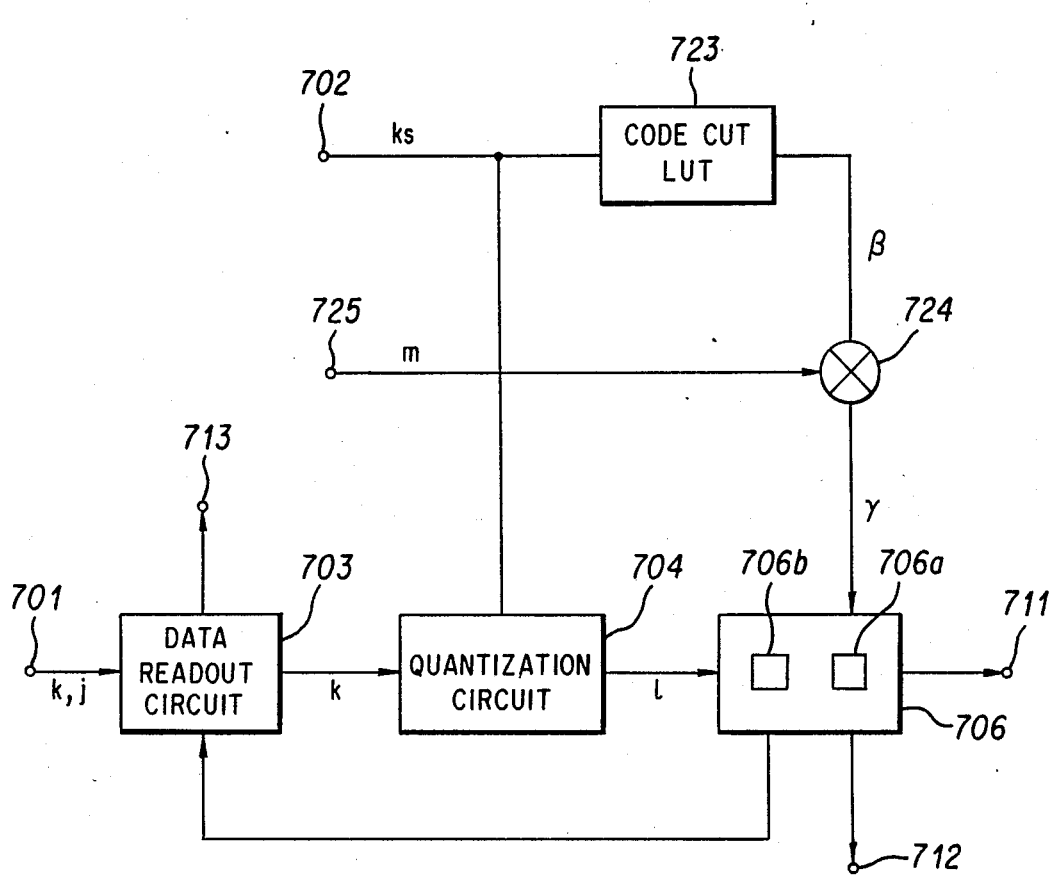

FIGS. 8A, 8B, and 8C show embodiments of the quantization coding unit 7 when the three types of high-sequency component cutting methods described above are used.

FIG. 8A shows an embodiment of the quantization coding unit 7 when the first high-sequency component cutting method is used, and its operation will be described below.

When the quantization interval determination unit 5 completes an operation for one block, the ½ quantization interval $k_s$ is fetched from a terminal 702 (which is connected to the terminal 510 shown in FIGS. 4A, 4B, or 4C), and is transformed to a component cut number x by a component cut LUT 721. The component cut number x is a number representing that only x components counted from low to high-sequency AC components are quantized and coded and the remaining high-sequency components are cut.

Figure 10C:
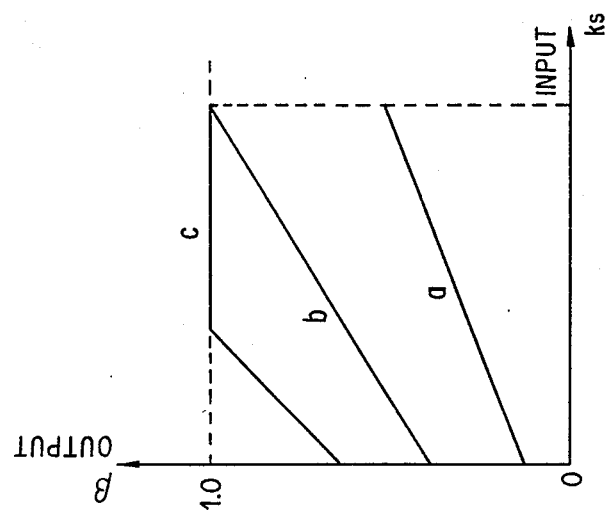
FIGS. 10A, 10B, and 10C are graphs showing different LUTs for determining a degree of cutting high-sequency components.
Figure 10B:
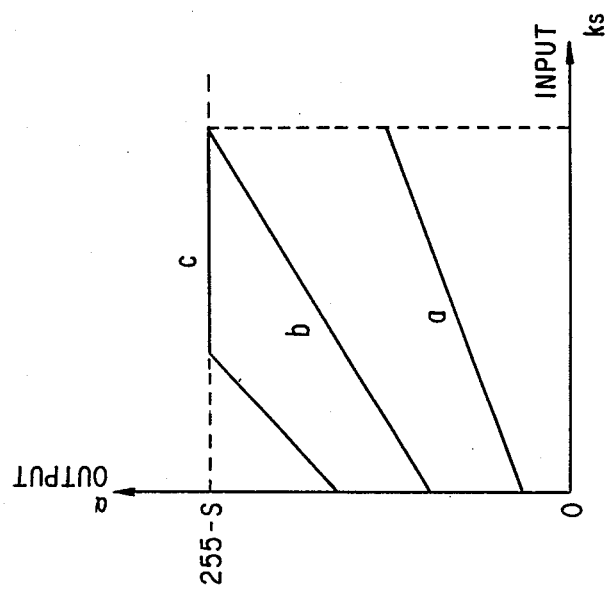
Figure 10A:
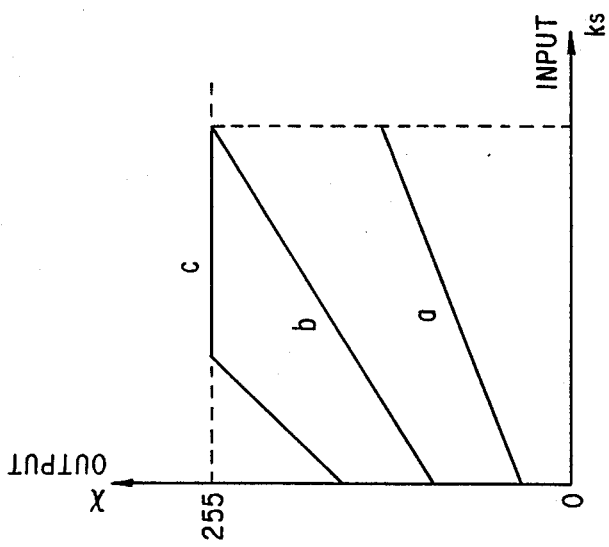

FIG. 10A shows an embodiment of the component LUT 721.

The component cut LUT 721 is an LUT for obtaining an output x in response to an input $k_s$. The smaller the value of $k_s$ becomes, the smaller the value of x is set. More specifically, the output x is set such that a larger number of high-sequency components are cut for a block having a smaller quantization interval. When a high compression ratio is to be obtained, an LUT represented by a line 2 is selected. When an intermediate compression ratio is to be obtained, an LUT represented by a line b is selected. When a high-quality reconstructed image is to be obtained at a low compression ratio, an LUT represented by a line c is selected.

In this manner, a plurality of LUTs are prepared, and an LUT is selected in accordance with the compression ratio, so that a compression apparatus allowing selection of a compression ratio can be constructed. When the component cut number x is determined, a data readout circuit 703 fetches x pairs of coefficient numbers k and polarity numbers j from a lower-sequency side from a terminal 701 connected to the block buffer memory 6. Of these pairs, the polarity numbers j are sent to a Huffman code LUT 708, and are referred upon Huffman coding. Meanwhile, the coefficient numbers k are fetched by a quantization circuit 704, and are subjected to Mid-trace type uniform quantization with a quantization interval $e_k (= 2k_s)$. Then the quantization results are output as code numbers l.

Figure 9:
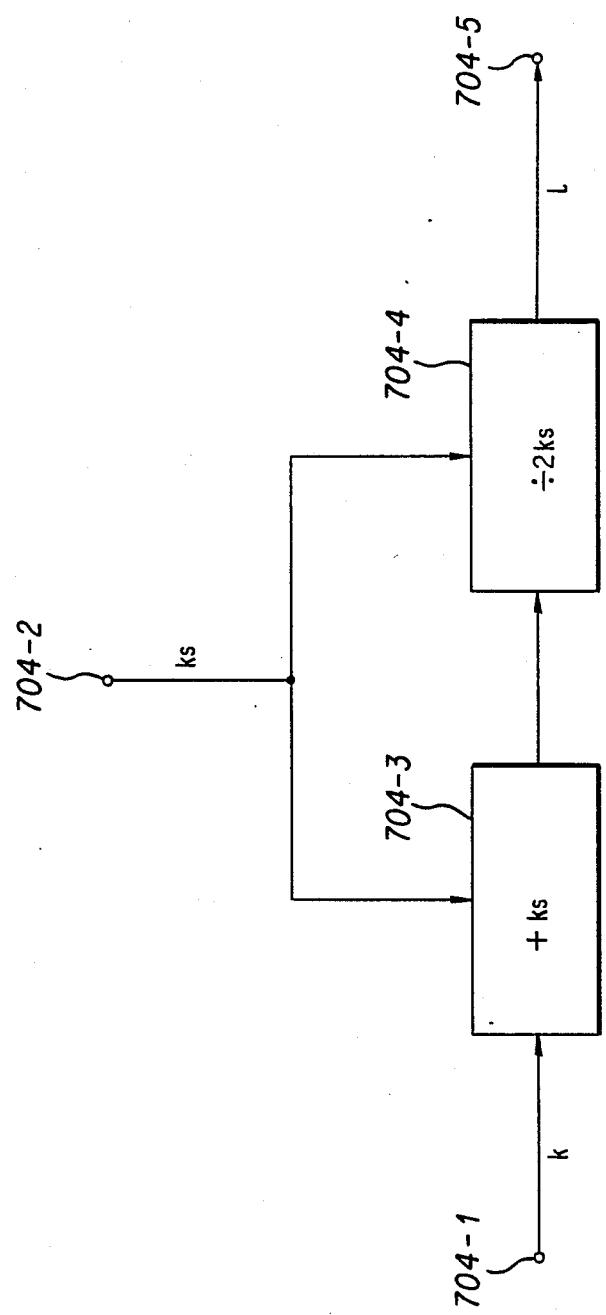
FIG. 9 is a block diagram of a quantizer of the quantization units shown in FIGS. 8A to 8C.

FIG. 9 shows an embodiment of the quantization circuit 704.

The ½ quantization interval $k_s$ is fetched from a terminal 704-2, and an addend $k_s$ and a divisor $2k_s$ are respectively set in an adder 704-3 and a divider 704-4. When the coefficient numbers k are fetched from the terminal 704-1, the adder 704-3 adds the addend $k_s$ to each coefficient number k, and the output $(k + k_s)$ from the adder 704-3 is divided by the divisor $2k_s$ by the divider 704-4. Then, an integral portion $(int\{(k + k_s)/2k_s\})$ of the quotient is output as the code number l from a terminal 704-5. Note that "int" means a function of rounding off fractions below the decimal point. In place of the quantization circuit shown in FIG. 9, quantization may be performed by using an LUT which receives the ½ quantization interval $k_s$, and outputs the code number l.

Figure 11:
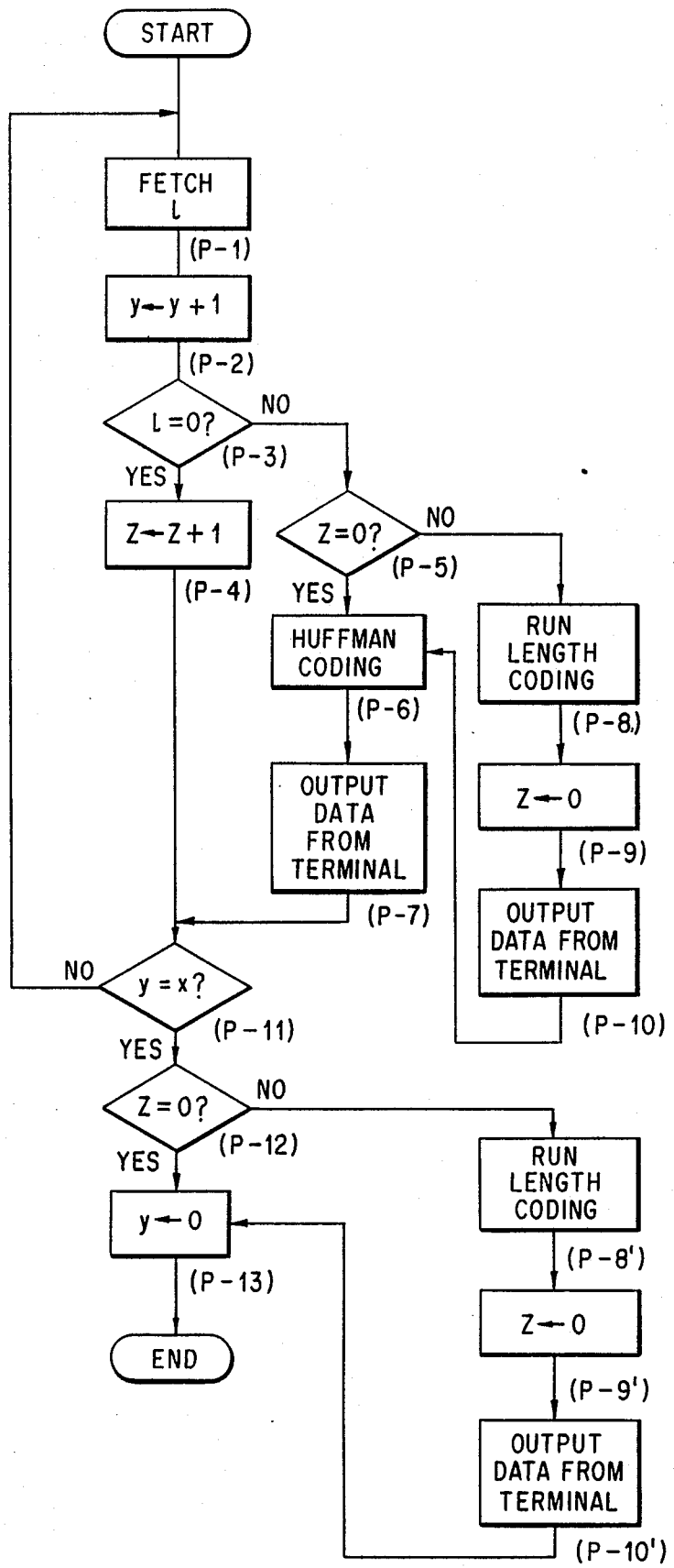
FIG. 11 is a flow chart showing an AC component coding sequence of the quantization unit shown in FIG. 1.

A coding sequence of AC components will be described with reference to the flow chart of FIG. 11.

The code numbers output from the quantization circuit 704 are sent to a zero determination circuit 706 having an internal code passage counter 706a (P-1). When the code passage counter 706a receives one code number l, it increments a code passage count value y by +1 (P-2), and the zero determination circuit 706 performs zero determination of the code number l (P-3). If l is zero, a zero count value z of a zero counter 707 is counted up by +1 (P-4), and thereafter, it is determined if the code passage count value y has reached the same value as the component cut number x (P-11). However, if l is not zero in determination of step P-3, it is determined if the zero count value z is zero (P-5). If the value z is zero, the code number l and the polarity number j paired therewith are converted to a variable length code $hl_j$ (P-6), and the code is output from a terminal 710 (P-7). Thereafter, it is determined if the code passage count value y has reached x (P-11). If it is determined in step P-5 that the zero count value z is not zero, the zero count value z is transformed to a variable length code rz by a run length LUT 709 (P-8), and the zero count value z is cleared to zero (P-9). Then, the code rz is output from the terminal 710 (P-10). Huffman coding of the code number l and the polarity number j is then performed (P-6), and the obtained Huffman code $hl_j$ is output from the terminal 710 (P-7). It is then determined if the code passage count y has reached x (P-11).

In determination of the code passage count value y in step (P-11), if the count value j has not reached x, the flow returns to step (P-1) of fetching the code number l and the above processing is repeated. However, in the determination of step (P-11), if the code passage count value y has reached x, it is determined if the zero count value z is zero (P-12). If zero, the code passage count value y is cleared to zero (P-13), and a coding operation of transform coefficients for one block is completed. If the zero count value z is not zero, the passage count value y is cleared to zero (P-13) after run length coding step (P-8'), zero clear step (P-9') of the zero count value z, and step P-10') of outputting the variable length code rz to the terminal 710 are performed. Thus, coding of transform coefficients for one block is completed.

FIG. 8B shows an embodiment of the quantization coding unit 7 when the second high-sequency component cutting method is used, and a difference from the quantization coding unit 7 described with reference to FIG. 8A will be described below.

A code cut LUT 722 transforms the ½ quantization interval $k_s$ fetched from a terminal 702 into a code cut number α. The code cut number α is a number of coding α "l"s of $l \neq 0$ counted from the lower frequency of the code numbers l output from a quantization circuit 704.

A zero determination circuit 706 includes a code detection counter 706b for counting the number of "l"s of $l \neq 0$ of the code numbers l output from the quantization circuit 704, in addition to a code passage counter 706a for counting the number of the code numbers l described with reference to FIG. 8A. When a count value (code detection count value) yb of this code detection counter becomes equal to the code cut number α, the zero determination circuit 706 supplies a data readout interruption instruction to the data readout circuit 703, thereby interrupting the quantization coding operation for one block.

Note that a terminal 713 is a terminal for outputting the polarity numbers j to the Huffman code LUT 708 described with reference to FIG. 8A. A terminal 711 is a terminal for outputting the code numbers l of l≠0 to the Huffman code LUT 708. A terminal 712 is connected to a zero counter 707. The quantization circuit 704 is operated in the same manner as that described with reference to FIG. 8A. The coding procedures are the same as those described with reference to FIG. 8A except that the code detection count value yb is used in place of the code passage count value y, and the code cut number α is used in place of the component cut number x.

FIG. 10B shows an embodiment of the code cut LUT 722.

The code cut LUT 722 is an LUT for obtaining an output α in response to an input $k_s$. The smaller the value of $k_s$ is, the smaller the value of α is set. More specifically, the number of components to be coded of the total number of components to be quantized to levels other than zero in each block is decreased for a block having a smaller quantization interval. Thus, a larger number of high-sequency components are cut for a block having a smaller value of $k_s$. Note that LUTs represented by a, b, and c are selected to change a compression ratio in the same manner as in FIG. 10A.

FIG. 8C shows an embodiment of a quantization coding unit 7 when the third high-sequency component cutting method is used, and a difference from the quantization coding unit 7 described with reference to FIG. 8B will be described hereinafter.

A code cut LUT 723 transforms a ½ quantization interval $k_s$ from a terminal 702 into a code passage ratio β. The code passage ratio β is a code for coding β×100 (%) "l"s of l≠0 of the code numbers l counted from the lower sequency side of the total number of "l"s of l≠0 of the code numbers l output from the quantization circuit 704. Therefore, the quantization interval determination unit 4 must output a count value (indicated by m) of a counter (having an operation range of $k_s$) used for determining the ½ quantization interval in addition to the ½ quantization interval $k_s$.

The count value m output from the quantization interval determination unit 4 is fetched from a terminal 725, and is multiplied with the code passage ratio β by a multiplier 724, thereby obtaining a code count number γ ($\gamma = int\{\beta \times m\}$). The code count number Y has a meaning of coding only γ "l"s of l≠0 counted from the lower sequency side of the code numbers l output from the quantization circuit 704, and operates in the same manner as the code cut number α described with reference to FIG. 8B. More specifically, the zero determination circuit 706 includes a code passage counter 706a for counting the code numbers l, and a code detection counter 706b for counting "l"s of l≠0 of the code numbers l. When the code detection count value yb becomes equal to the code count number γ, the zero determination circuit 706 supplies the data readout interruption instruction to the data readout circuit 703, thus completing a quantization coding operation for one block.

The functions of the terminals 711, 712, and 713, the operation of the quantization circuit 704, and the coding procedures are the same as those in FIG. 8B.

FIG. 10C shows an embodiment of the code cut LUT 23.

The code cut LUT 723 is an LUT for obtaining an output β in response to an input $k_s$, and the smaller the value of $k_s$ is, the smaller the value of β is set. More specifically, the ratio of the number of components to be coded of those quantized to levels other than zero to the total number of components to be quantized to levels other than zero in each block is decreased for a block having a smaller quantization interval, so that a larger number of high-sequency components are cut for a block having a smaller value of $k_s$.

Note that LUTs represented by a, b, and c are selected to change a compression ratio in the same manner as in FIGS. 10A and 10B.

FIG. 12A shows an embodiment of the Huffman code LUT 708.

In this embodiment, a Huffman code $hl_j$ common to every $k_s$ or quantization interval is used. When uniform quantization is performed like in this embodiment, there is no large difference in compression ratio between a case wherein individual Huffman codes are used for different quantization intervals and a case wherein a common Huffman code is used for different quantization intervals. Therefore, a common Huffman code can be used for different quantization intervals.

FIG. 12B shows an embodiment of the run length LUT 709.

In this embodiment, a B1 code is used as a run length code assigned to a zero count value z. Since a frequency distribution of zero run lengths when halftone image data is compressed by the method of the present invention becomes an exponential distribution suitable for the B1 code, a high compression ratio can be obtained by using the B1 code. Note that C and $\overline{C}$ are 1-bit codes taking "0" or "1" and satisfying the relation $\overline{C} \neq C$.

Figure 13A:
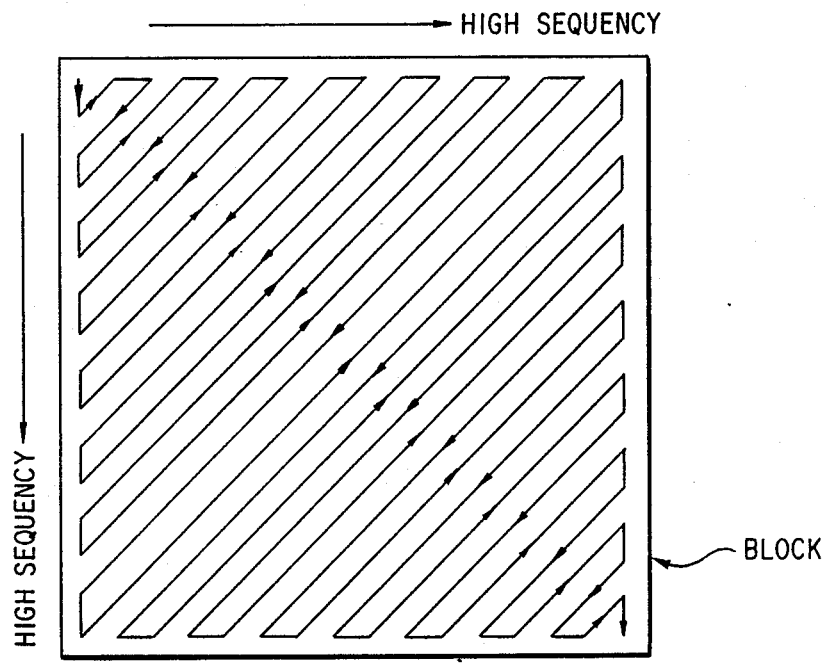
FIGS. 13A and 13B are charts showing a data read order in FIG. 8.
Figure 13B:
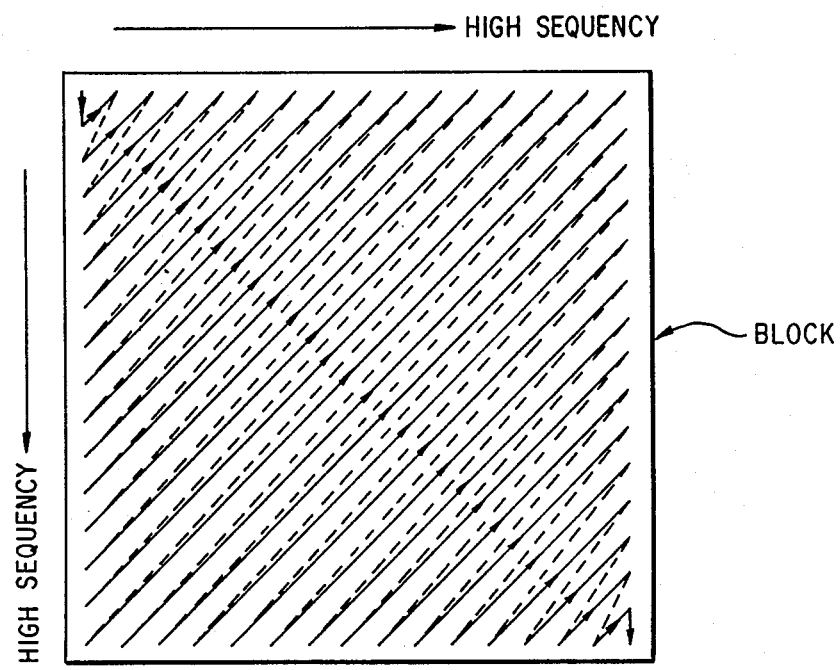

FIGS. 13A and 13B show a data readout order of the data readout circuit 703 shown in FIGS. 8A to 8C.

Since transform coefficients of a halftone image tends to have a smaller amplitude as a sequency of components is increased, the possibility of generation of components quantized to zero is also increased. Therefore, shown in FIGS. 13A or 13B, if coding is performed from the lower-sequency side in the higher-sequency direction, a possibility of generation of longer zero runs is increased, and hence, effective run length coding can be performed.

FIG. 14(A-D) shows a code format.

Figure 14A:
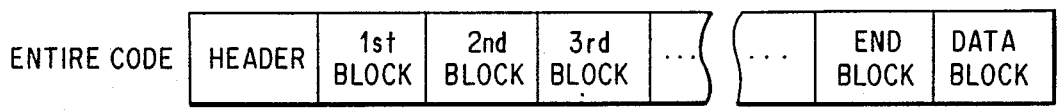
FIGS. 14A, 14B, 14C, 14D, and 14E are views showing code formats.
Figure 14B:
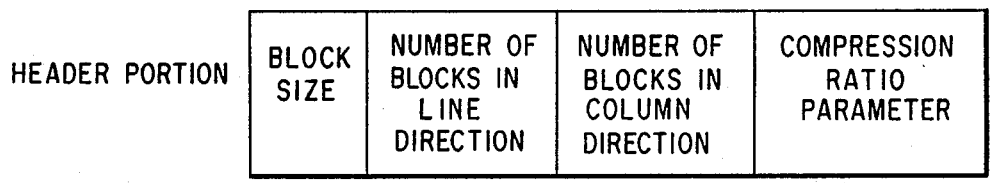
Figure 14C:
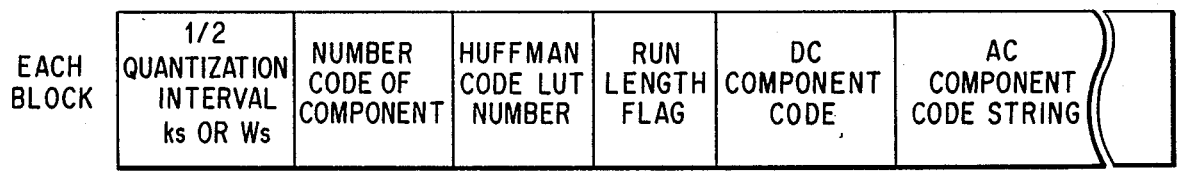
Figure 14D:
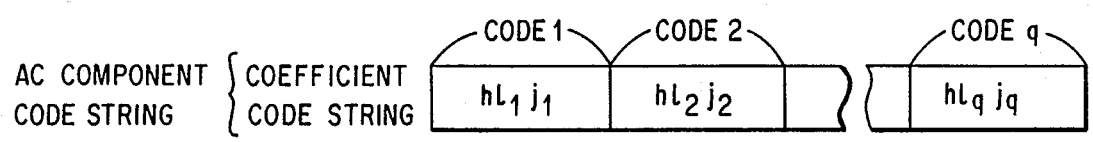
Figure 14E:

FIG. 14A is a code format as a result of compressing the entire image of one frame, and the code in FIG. 14A consists of a header portion, codes of blocks, and a data end code. FIG. 14B shows a header portion format, and a block size (16 in this embodiment), the number of blocks in an image line direction, the number of blocks in an image column direction, and a compression ratio parameter indicating a selected compression ratio when a compression ratio can be selected, are stored. FIG. 14C shows a code format of each block. The code shown in FIG. 14C consists of a ½ quantization interval $k_s$ or $W_s$ (fixed length code), a final value (fixed length code) of the code passage count value y indicating the number of coded AC components, an LUT number used (fixed length code) when a plurality of Huffman code LUTs are provided, a flag (fixed length code) indicating whether the run length coding is performed or not, a DC component code (fixed length code), and an AC component code string (variable length code string). The AC component code string has a format in which coefficient code strings each consisting of g ($1 \leq q \leq 255$) codes (variable length code strings $h_{l_1j_1}$, $h_{l2j2}, \ldots, h_{lqjq}$) shown in FIG. 14D, and run length codes (variable length codes rz) shown in FIG. 14E alternately appear.

A variety of parameters used in this embodiment will be described below.

Fundamental quantization interval $W_0 = 0.25$
$S = 200$

Note that the above parameters are values when the number of bits per pixel of an original image is n bits (n=8 in this embodiment), and if a block size is of N×N (in this embodiment N=16), a block image is represented by f(x,y), and a transform coefficient matrix is represented by f(u,v):

$$F(u,v) = (2/N)C(u,v) \cdot \sum_{x=0}^{N-1}\sum_{y=0}^{N-1} f(x,y)\cos\{(2x+1)u\pi\}/2N \cdot \cos\{(2y+1)v\pi\}/2N$$

For $$C(u,v) = \begin{cases} 1/2 & (u = v = 0) \\ 1 & (u \neq 0 \text{ and } v \neq 0) \\ 1/\sqrt{2} & (\text{others}) \end{cases}$$

In the present invention, other orthogonal transformation units, e.g., a two-dimensional Hadamard transformation unit, a Slant transformation unit, and the like may be used in place of the 2D-DCT unit 3. The present invention is not limited to the 16×16 block size, but may be applied to 8×8, 32×32, 64×64 ... sizes. In addition, the number of bits per pixel of an original image is not limited to 8 bits.

As the quantization interval is decreased, assignment of one Huffman code to components quantized to zero can improve coding efficiency over a case wherein the number of components quantized to zero is transformed to a run length code. By utilizing such characteristics, the quantization coding unit 7 may be arranged as follows. In a block having a small quantization interval, all the components to be coded are coded using the Huffman code, and in a block having a large quantization interval, components quantized to levels other than zero are coded using the Huffman code, and the number of components quantized to zero is coded using a run length code.

Figure 2B:
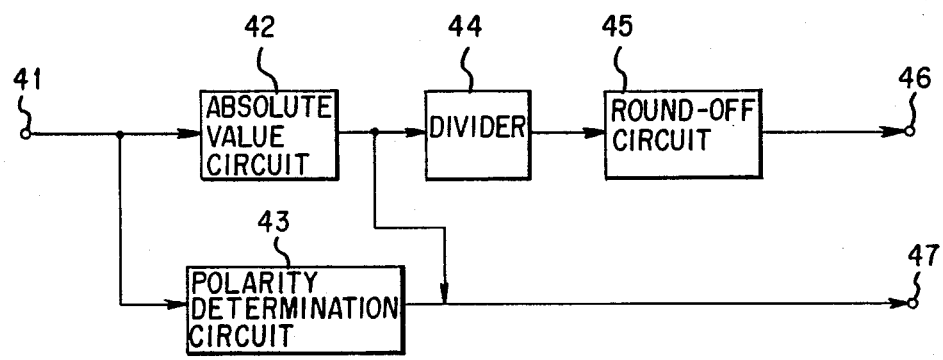
FIG. 2B is a diagram showing a modification of the fundamental quantization unit.

A quantization interval can be determined for a coefficient number k after fundamental quantization, and quantization may be performed for a transform coefficient W before fundamental quantization. In this case, the fundamental quantization unit 4 is arranged as shown in, e.g., FIG. 2B. The same reference numerals in FIG. 2B denote the same parts as in FIG. 2A, and a detailed description thereof will be omitted. A terminal 46 connected to the quantization interval determination unit 5 receives coefficient numbers k output from the round-off circuit 45, and a terminal 47 connected to the block buffer memory 6 receives absolute values |W| of the transform coefficients W as the outputs from the absolute value circuit 42, and polarity numbers j as the outputs from the polarity determination circuit 43. In this case, the output from the quantization interval determination unit 5 is the ½ quantization interval $W_s$, and any of the above-mentioned three methods can be used as the quantization interval determination method. The quantization coding unit 7 is arranged such that the ½ quantization interval $k_s$ is replaced with $W_s$.

According to the present invention as described above, the frequency of generation of AC components of transform coefficients to be quantized to zero in each block is used as a parameter, and a quantization interval is set in units of blocks. Thus, the quantization interval can be determined in consideration of rounding-off of the transform coefficients to zero by quantization, and a good reconstructed image in which generation of a pattern image inherent to components as a drawback of Mid-trace quantization can be suppressed can be obtained.

A cut ratio of high-sequency components of each block is determined on the basis of the determined quantization interval and a selected compression ratio. In this case, in a block having a small quantization interval, the degree of cutting high-sequency components is increased, and in a block having a larger quantization interval, the degree of cutting high-sequency components is decreased. Thus, blurring of an image at a high compression ratio can be suppressed.

What we claim is:

1. A halftone image data compression method wherein digital halftone image data is divided into a plurality of blocks, orthogonal transformation is performed in units of blocks to obtain transform coefficients, and the transform coefficients are quantized and coded, characterized in that a final quantization interval is determined in units of blocks using a frequency of generation of AC components of transform coefficients quantized to zero of each block as a parameter.

2. A method according to claim 1, characterized in that an upper limit value of the quantization interval is determined for each compression ratio, and when the determined quantization interval exceeds the upper limit value at the selected compression ratio, the determined quantization interval is replaced with the upper limit value.

3. A method according to claim 1, wherein a degree of cutting high-sequency components is set in advance for each compression ratio as a function of the quantization interval, and when AC components of each block are quantized and coded using the determined quantization interval, the high-sequency components of each block are cut at the degree of cutting high-sequency components obtained by substituting the determined quantization interval in the function of the selected compression ratio.

4. A method according to claim 3, characterized in that the function is determined as a function in which as the quantization interval is decreased, the degree of cutting high-sequency components is increased, and as the compression ratio is increased for an identical quantization interval, the degree of cutting high-sequency components is increased.

5. A method according to claim 1, characterized in that upon determination of the final quantization interval, a plurality of different quantization intervals are set in advance, the number of AC components quantized to zero when quantization of AC components is performed with each quantization interval is calculated, a quantization interval with which the number becomes maximum but smaller than a predetermined threshold level is detected, and the detected quantization interval or an approximated value of the detected quantization interval is determined as the final quantization interval.

6. A method according to claim 1, characterized in that upon determination of the final quantization interval, a component for which the number of components counted from one having a smallest absolute value of an AC component becomes equal to a predetermined threshold level is detected, and the absolute value of the detected component or an approximated value of the absolute value is determined as the final quantization interval of the block.

7. A method according to claim 1, characterized in that upon determination of the final quantization interval, the number of AC components quantized to zero when quantization of AC components is performed using a predetermined quantization interval is calculated, a small final quantization interval is assigned to a block having the large number, and as the number is decreased, the final quantization interval to be assigned is increased.

8. A method according to claim 3, characterized in that the degree of cutting the high-sequency components is defined by the number of components to be coded in each block, and the number is set in advance as a function of the quantization interval.

9. A method according to claim 8, characterized in that when "numbers of components to be coded in each block" calculated by the function for arbitrary two quantization intervals $W_{k1}$ and $W_{k2}$ are respectively given by $X_{k1}$ and $X_{k2}$, the function is a function satisfying $X_{k1} \leq X_{k2}$ when $W_{k1} < W_{k2}$.

10. A method according to claim 3, characterized in that the degree of cutting high-sequency components is defined by the number of components to be coded of those quantized to levels other than zero in each block, and the number is set in advance as a function of the quantization interval.

11. A method according to claim 10, wherein when "numbers of components to be coded of those quantized to levels other than zero in each block" calculated by the function for arbitrary two quantization intervals $W_{k1}$ and $W_{k2}$ are respectively given by $\alpha_{k1}$ and $\alpha_{k2}$, the function is a function satisfying $\alpha_{k1} \leq \alpha_{k2}$ when $W_{k1} < W_{k2}$.

12. A method according to claim 3, characterized in that the degree of cutting the high-sequency components is defined by a ratio of the number of components to be coded of those quantized to levels other than zero to the total number of components quantized to levels other than zero in each block, and the ratio is set in advance as a function of the quantization interval.

13. A method according to claim 12, characterized in that when "ratios of the number of components to be coded to the total number of components quantized to levels other than zero in each block" calculated by the function for arbitrary two quantization intervals $W_{k1}$ and $W_{k2}$ are respectively given by $\beta_{k1}$ and $\beta_{k2}$, the function is a function satisfying $\beta_{k1} \leq \beta_{k2}$ when $W_{k1} < W_{k2}$.

14. A method according to claim 1, characterized in that, when quantization is performed with the determined quantization interval, and the quantization results is coded, components quantized to levels other than zero are coded using a Huffman code, and the number of components quantized to zero is coded using a B1 code.

15. A method according to claim 1, characterized in that the quantization interval is determined using a fixed length code as a result of quantization of AC components of transform coefficients obtained by orthogonal transformation with a fundamental quantization interval common to all the blocks, and quantization of AC components with a quantization interval determined for each block is performed for the fixed length code.

16. A method according to claim 1, characterized in that the quantization interval is determined using a fixed length code as a result of quantization of AC components of transform coefficients obtained by orthogonal transformation with a fundamental quantization interval common to all the blocks, and quantization of AC components with a quantization interval determined for each block is performed for transform coefficients prior to quantization with the fundamental quantization interval.

* * * * *